United States Patent Office 2,810,703
Patented Oct. 22, 1957

---

2,810,703

VINYL DISPERSIONS CONTAINING AMINE SALTS

Homer J. Sims, Philadelphia, Pa., assignor to Rohm & Haas Company, Philadelphia, Pa., a corporation of Delaware No Drawing. Application November 9, 1954,
Serial No. 467,873

11 Claims. (Cl. 260—30.8)

This invention deals with fluid dispersions of polyvinyl chloride resins in plasticizer. It concerns compositions of matter in which a finely particled thermoplastic resin of a dispersion grade of polyvinyl chloride or copolymers of vinyl chloride and another polymerizable monovinylidene compound, such as vinyl acetate, is suspended or dispersed in a plasticizer therefor, the viscosity of the resultant suspension or dispersion being decreased by the presence therein of a salt of a trialkylcarbinylamine of 12 to 24 carbon atoms.

Dispersions of polyvinyl chloride and copolymers of vinyl chloride and other polymerizable vinylidene compounds have become widely used for coating and molding. Dispersions of polyvinyl chloride resins of fine particle size, made in a plasticizer which has relatively low solvent action on the resin at room temperature, are termed plastisols. These must have good flow properties at low to moderate temperatures and yet be converted to a tough, rubbery form when heated at temperatures which cause fusion or fluxing of the dispersion.

When the plastisol is diluted with a volatile organic solvent or the dispersion is made with plasticizer and volatile dispersant and/or diluent, more fluid compositions result which are termed organosols and which are of advantage at times in coating paper, cloth, wire, and the like, in dip coating, and in forming unsupported films. The volatile substituents must, however, be driven off and the mixture of resin and plasticizer fused or fluxed. It is desirable in such applications to have maximum fluidity with a minimum of volatile material.

Good flow properties are essential for both plastisols and organisols in order that the forming operation be readily and rapidly carried out and that the form or shape of the coated or molded object be true, free from flaws, and homogeneous. Agents which assist in imparting good flow properties are, therefore, greatly to be desired. Such agents must maintain relative stability of plastisol or organosol and of the fluxed resin, remain effective during their storage, and not interfere with the fluxing of the resin-plasticizer dispersion.

Some adjustment of the viscosity has been effected by utilizing plasticizers of low efficiency, but this is not a desirable course. A minor change in viscosity can be made by mixing several sizes of resin particles with the plasticizer. While addition of water decreases viscosity, it introduces a volatile substance which must be driven off and may cause pores or imperfections. It has also been noted that some amines tend to lower the viscosity of some plastisols when they are first prepared. Their effect does not, however, seem to persist and there are many objections to incorporating these basic agents, including volatility, reactivity, loss of stability, development of color, and odor.

It has now been found that addition to a plastisol or organosol of a minor proportion of a salt of a trialkylcarbinylamine of 12 to 24 carbon atoms effectively reduces the viscosity of the resulting compositions without causing deleterious effects. The decrease in viscosity thus secured is persistent and retained by the plastisol or organosol until it is fluxed. Thus the compositions of this invention may be prepared and used at once or shipped and stored over a long period of time. The application properties of these compositions are superior to those of previously proposed compositions lacking the viscosity depressing agents here described. The fluxed products therefrom are likewise advantageous.

The salts of trialkylcarbinylamines which are thus useful have the general formula

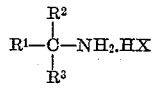

where $R^1$, $R^2$, and $R^3$ are alkyl groups which together contain a total of 11 to 23 carbon atoms and HX is an equivalent of an acid. The acid may be inorganic, such as sulfuric, phosphoric, hydrochloric, or hydrobromic, these being typical strong inorganic nonoxidizing acids, p-toluenesulfonic acid, benzenesulfonic acid, or an alkanesulfonic acid or a carboxylic acid, such as formic, acetic, propionic, lactic, glycolic, hydracrylic, malic, citric, fumaric, benzoic, chloroacetic, or other carboxylic aid having a dissociation constant greater than $10^{-6}$.

Tert-alkylamines of the above formula are available commercially. They have branched hydrocarbon chains which together with the tertiary carbon atom to which the primary amine group is attached impart many surprising properties to these amines and their derivatives. For instance, the salts of the defined amines are soluble in plastisols where as salts of n-alkylamines are not thus soluble. When one percent of n-dodecylamine sulfate is dispersed in a plastisol of equal weights of a dispersion grade of polyvinyl chloride and di-2-ethylhexyl phthalate, for instance, the viscosity of the resulting mixture is increased about 90%. Addition of one percent of n-octadecylamine sulfate to an identical plastisol was found to increase the viscosity 62%, while one percent of n-octadecylamine glycolate increased the viscosity 30%.

The resins used for preparing plastisols and organosols are primarily polyvinyl chloride and copolymers from vinyl chloride in major proportion modified by the presence of a minor proportion of some other polymerizable vinylidene compound, such as vinyl acetate, vinyl propionate, vinyl butyrate, vinylidene chloride, methyl or ethyl maleate or fumarate, ethyl acrylate, or the like. The copolymers are usually based on 90% to 99% of vinyl chloride.

Of importance as great as the chemical nature of the resins is their physical form. Relatively fine particles are essential, these being conveniently available from emulsion polymerization. When the fine particles are but little coagulated, they may be mixed with plasticizer by good stirring. When particles are coalesced, mixing coupled with grinding or milling is necessary. It is desirable in either case that the particles have high density and present a minimum surface per weight of particle, indicating the desirability of the spherical shape. Particle sizes from 0.02 to 2 microns or somewhat larger in diameter are commercially available in dispersion grades of resin. The smaller sizes are generally preferred for preparing organosols, whereas grades of resins with relatively larger particles are desired in preparing plastisols.

Plasticizers include monomeric and polymeric types, blends of the two types being frequently used. Typical plasticizers of the first type include such esters as dioctyl phthalate, di-2-ethylhexyl phthalate, dicapryl phthalate, dibutyl adipate, azelate, or sebacate, dioctyl adipate, azelate, or sebacate, trioctyl phosphate, alkyl diphenyl phosphates, etc. Polymeric plasticizers include condensates from dicarboxylic acids such as adipic, azelaic, or sebacic and alkylene glycols. The plasticizer or mixture of plasticizers is selected to give good wetting and dispersing action without solution of resin at low temperatures. Yet at elevated temperatures the resin-plasticizer mixture must fuse, the resin becoming solvated. The plasticizer combination will to an important extent determine flow properties and the properties of the fused product. The ratio of plasticizer to resin ordinarily varies from 1:2 to 2:1 depending no circumstances and needs.

The plastisol can be thinned, as has been indicated with organic solvents which act as diluents or dispersants, ketones and hydrocarbons being used for this purpose.

There may also be admixed pigments, fillers, dyes, and stabilizers. These are usually dispersed in a portion of plasticizer and then mixed with the dispersion of resin and plasticizer.

During the mixing and compounding of a plastisol or organosol there is added according to this invention generally from about 0.1% to 5% by weight, preferably 0.5% to 3%, of a defined tert-alkylamine salt, based on the weight of the composition. It has been observed that when through choice of materials there results a plastisol which is somewhat too viscous and yet otherwise has good properties, a few hundredths of a percent of one of these amine salts has a pronounced effect in decreasing viscosity. The lower limit therefore, of use under these conditions is about 0.02%. For the average mixture an amount of the amine salt within the preferred range is used. Again, when it is desider to use a considerable proportion of pigments or fillers or a maximum proportion of resin, the amount of the amine salt will desirably be at a relatively high level.

Amounts of tert-alkylamine salt may be varied somewhat from batch to batch of plastisol or organosol so as to produce a uniform final viscosity. As is known, there is frequently some variation in viscosity from batch to batch even with an effort to maintain constant conditions. Such variations can be offset by adjusting the amount of tert-alkylamine salt which is added. This provides better control of the steps of spreading, dipping, coating, or the like.

A typical plastisol may be made by mixing together 100 parts by weight of a dispersion grade polyvinyl chloride, 20 parts of di-2-ethylhexyl phthalate, 20 parts of octyl diphenyl phosphate, 10 parts of dioctyl sebacate, and 15 parts of a fatty glyceride epoxide. Thereto is added 1.65 parts of tert-dodecylamine sulfate. The resulting composition has excellent flow properties and is markedly less viscous than a similar composition without the added amine salt. The viscosity of the above composition remains relatively stable on storage over many months, the percentage reduction of viscosity remaining rather constant.

Another typical composition is made from 100 parts of a stir-in grade of a copolymer of vinyl chloride and vinyl acetate (95:5), 45 parts of di-2-ethylhexyl phthalate, 25 parts of dioctyl sebacate, 2 parts of basic lead sulfate, 5 parts of clay, one part of carbon black of a grade made for plastisols, and 2 parts of tert-dodecylamine hydrochloride. The addition of this salt reduces the viscosity of the plastisol over 40%. The above composition is stable on prolonged storage with respect to viscosity, color, and other properties.

Equal weights of a stir-in grade of a polyvinyl chloride and of di-2-ethylhexyl phthalate are mixed. One portion is taken as a control. To another portion is added the sulfate salt of a commercial tert-alkylamine, $RNH_2$, in which R represents trialkylcarbinyl groups from 15 to 24 carbon atoms at 1% of the weight of the composition. To a third portion there is added 1% of cyclohexylamine, as a most effective representative of amines which have previously been suggested for addition. Viscosities are determined for each portion with a Brookfield viscosimeter with a #4 spindle at 60 R. P. M. A viscosity reduction of about 65% is found for the composition with amine salt five days after preparation and again after about seven weeks. The portion containing cyclohexylamine exhibits a viscosity reduction of 26% at five days and 16% at 47 days.

The viscosity of a mixture of 100 parts of stir-in grade polyvinyl chloride and 90 parts of di-2-ethylhexyl phthalate is reduced 70% to 80% during a period of examination up to 50 days upon addition of 1% of the same sulfate salt used in the immediately previous composition.

Portions of each of the above plastisols made with a 100 to 90 and 100 to 100 mixture of polyvinyl chloride and di-2-ethylhexyl phthalate are treated with naphtha in a 90 to 10 ratio of plastisol to solvent to form organosols. Each is treated with 1% of the sulfate salt used directly above. There is a reduction of about 80% in viscosity at the 5 day test and a reduction of 75% at the 50 day test. This reduction of viscosity is observed even after 240 days of storage at room temperatures.

A mixture is made of 62.5 parts of a dispersion grade of a commercial polyvinyl chloride and 37.5 parts of di-2-ethylhexyl phthalate. Addition of 1% of various salts of long-chained amines is made thereto. The various preparations are stored for a day and examined. The viscosity is determined with a Brookfield viscosimeter as above. Changes in viscosity are observed as follows: with 1% of tert-dodecylamine glycolate, a reduction of 52%; with 1% of tert-dodecylamine sulfate, a reduction of 68%; with 1% of the glycolate of the commercial trialkylcarbinylamine having N-groups of 15 to 24 carbon atoms, a reduction of 48%; with 1% of the sulfate of this last amine, a reduction of 53%; with n-dodecylamine sulfate, an increase of viscosity of 89%; with 1% of n-dodecylamine glycolate, a reduction of 4%; with n-octadecylamine glycolate, an increase of 30%; and with n-octadecylamine sulfate, an increase of 62%. Pure n-dodecylamine in this composition caused an increase in viscosity of 107%.

There are other very interesting differences between the long, straight-chained amines and the trialkylcarbinyl amines. The former and the usual salts thereof have very little, if any, solubility in plastisols. Films layed down from plastisols in which 1% of these has been mixed are turbid. Also, when the plastisols containing the long, straight-chained amines or their salts are heated at 350° F. for ten minutes considerable and objectionable colors developed. There was little color change when plastisols of this invention were heated under identical conditions. The glycolate salts of the tert-alkylamines are exceptionally favorable with respect to color stability.

The preparation of amine salts is readily accomplished by bringing together amine and acid in approximately equivalent proportions. This may be done directly or in the presence of a solvent, such as water. With the largest amines there is an advantage in having an excess of amine present over the acid as the mixture formed from any of the trialkylcarbinylamines is fluid and is readily handled.

For example, a commercial trialkylcarbinylamine consisting of a mixture of tert-alkylamines (compound A below) having alkyl groups of 15 to 24 carbon atoms and having a neutralization equivalent of 304, as determined by titration in a non-aqueous system, is taken and 251 parts by weight (0.83 equivalent) mixed with 34.2 parts by weight of 98% sulfuric acid and 14.4 parts of water. The temperature of the mixture rises to 110° C. The temperature drops as stirring is continued over 1.5 hours. The reaction mixture can be used directly in its fluid form or water may be stripped from the product and the dried product then used.

In a similar manner there is used a commercial trialkylcarbinylamine (compound B below) which is a mixture of $C_{12}H_{25}NH_2$ and $C_{15}H_{31}NH_2$, wherein the alkyl groups are attached to nitrogen at a tertiary carbon atom. This material has a neutralization equivalent of 222. There are mixed 166.5 parts (0.75 mole) of this amine and 91 parts of aqueous 62.5% glycolic acid (0.75 mole). The temperature rises to 91° C. The mixture is stirred for two hours and is ready for use as is or it may be stripped by heating under reduced pressure to take off water. The product is the amine glycolate. In the same way other salts can be prepared from other acids and/or from other trialklycarbinylamines.

Plastisols were prepared from amine salts such as prepared just above and also from the hydrochlorides and phosphates, prepared in the same way. In every case marked reductions in viscosity were found when these salts were mixed into plastisols and the percentage reduction was well maintained with time.

A base plastisol was made by charging a vessel equipped with an efficient stirrer with 125 parts of dioctyl phthalate. Thereto was added over a period of five minutes 312.5 parts of a commercial grade of a stir-in type of a vinyl chloride resin containing a minor proportion of vinyl acetate. An additional portion of 37.5 parts of dioctyl phthalate was added and stirring continued for five minutes. Separate portions of 95 parts each were taken. There were separately mixed one part of each amine salt and five parts of dioctyl phthalate. The 95 part portion of plastisol and solution of amine salt were then thoroughly mixed and conditioned at 77° F. for a day. Viscosities of the series of mixtures were then determined with a Brookfield viscosimeter at 6 and 30 R. P. M. Viscosities were again measured at seven days and at 42 days. Comparisons were made against a control from 95 parts of the plastisol and 5 parts of dioctyl phthalate. Viscosity data are summarized in Tables I and II.

TABLE I

*Poises at 6 R. P. M.*

| Composition | Time | | |
|---|---|---|---|
| | 1 day | 7 days | 42 days |
| Control | 440 | 620 | 800 |
| B. Glycolate | 260 | 440 | (¹) |
| A. HCl | 125 | 170 | 230 |
| A. Sulfate | 130 | 160 | 240 |
| A. Phosphate | 190 | 290 | 430 |
| A. Acetate | 250 | 400 | 490 |
| Original | 500 | 710 | 920 |

¹ Not determined.

TABLE II

*Poises at 30 R. P. M.*

| Composition | Time | | |
|---|---|---|---|
| | 1 day | 7 days | 42 days |
| Control | 220 | 296 | 364 |
| B. Glycolate | 188 | 264 | (¹) |
| A. HCl | 92 | 124 | 154 |
| A. Sulfate | 104 | 118 | 160 |
| A. Phosphate | 118 | 192 | 236 |
| A. Acetate | 160 | 234 | 250 |
| Original | 254 | 336 | 414 |

¹ Not determined.

It will be noted that while there is a tendency for viscosities to increase on storage, reduction of viscosity caused by the added tert-alkylamine salt is well maintained with the percentage reduction holding about constant.

A very fluffy powder of a copolymer of vinyl chloride and ethyl maleate recommended for the preparation of organosols is milled with plasticizers and diluents in the conventional manner. Portions of the resulting organosols are treated with 0.5% to 3% of the sulfate of tert-octadecylamine. In every case the organosol is significantly less viscous than the controls, the reduction in viscosity being from 40% to 80%.

It has been found that the compositions containing a tert-alkylamine salt as defined are much more readily handled and used than the base plastisol or organosol. Films from the compositions of this invention are almost free from bubbles from occluded air, while films from control samples are troublesome in this respect. The films from compositions of this invention are improved as to gloss.

Addition of small amounts of the tert-alkylamine salts permits considerable latitude in choice of compounding materials and use of an increased proportion of fillers and pigments. Decrease of viscosity permits use of relatively large proportions of plasticizers of high molecular weight, such as polyesters, with their inherent advantages. The decreased viscosity provides better working properties. The compositions can be spread, for instance, evenly and without development of inhomogeneities. The compositions are less thixotropic than organosols or plastisols free of the tert-alkylamine salts, a particularly important improvement in dip-molding or slush-molding or in other applications where shearing forces are low.

I claim:

1. A composition of matter comprising a polyvinyl chloride resin dispersed in a plasticizer therefor and a salt of a trialkylcarbinylamine having a carbon content of 12 to 24 carbon atoms and of an acid selected from the class consisting of strong non-oxidizing inorganic acids, hydrocarbon sulfonic acids of not over seven carbon atoms, and carboxylic acids having a dissociation constant greater than $10^{-6}$, said salt being present in an amount between 0.02% and about 5% of the weight of the resulting composition and sufficient to reduce the viscosity of the dispersion of said resin in said plasticizer and to improve the flow properties of the composition.

2. A composition of matter comprising a polyvinyl chloride resin dispersed in a plasticizer therefor and 0.1% to 5% of the weight of the composition of a salt of an amine of the formula

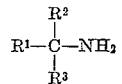

where $R^1$, $R^2$, and $R^3$ are alkyl groups having a total of 11 to 23 carbon atoms and of an acid selected from the class consisting of strong, non-oxidizing inorganic acids, hydrocarbon sulfonic acids of not over seven carbon atoms, and carboxylic acids having a disassociation constant greater than $10^{-6}$, the proportion of said salt being sufficient to reduce the viscosity of the dispersion of said resin in said plasticizer and improve the flow properties thereof.

3. A composition of matter comprising a polyvinyl chloride resin dispersed in a plasticizer therefor and between 0.1% and 5% of the weight of the composition of a salt of tert-dodecylamine and a strong non-oxidizing inorganic acid, the proportion of said salt being sufficient to reduce the viscosity of the dispersion of said resin in said plasticizer and improve the flow properties thereof.

4. A composition according to claim 3 wherein the acid is sulfuric acid.

5. A composition of matter comprising a polyvinyl chloride resin dispersed in a plasticizer therefor and between 0.1% and 5% of the weight of the composition of a salt of tert-dodecylamine and glycolic acid, the proportion of said salt being sufficient to reduce the viscosity of the dispersion of said resin in said plasticizer and improve the flow properties thereof.

6. A composition of matter comprising a polyvinyl chloride resin dispersed in a plasticizer therefor and between 0.1% and 5% of the weight of the composition of a salt of a mixture of tert-alkylamines, RNH₂, where R represents alkyl groups of 15 to 24 carbon atoms, and a strong non-oxidizing inorganic acid, the proportion of said salt being sufficient to reduce the viscosity of the dispersion of said resin in said plasticizer and improve the flow properties thereof.

7. A composition of matter comprising a polyvinyl chloride resin dispersed in a plasticizer therefor and between 0.1% and 5% of the weight of the composition of a salt of a mixture of tert-alkylamines, $RNH_2$, where R represents alkyl groups of 15 to 24 carbon atoms, and glycolic acid, the proportion of said salt being sufficient to reduce the viscosity of the dispersion of said resin in said plasticizer and improve the flow properties thereof.

8. A composition of matter comprising a polyvinyl chloride resin dispersed in a plasticizer therefor and an inert volatile organic solvent and a salt of a trialkylcarbinylamine having a carbon content of 12 to 24 carbon atoms and of an acid selected from the class consisting of strong, non-oxidizing inorganic acids, hydrocarbon sulfonic acids of not over seven carbon atoms, and carboxylic acids having a disassociation constant greater than $10^{-6}$, the amount of said salt in said composition being from about 0.1% to 5% by weight and sufficient to reduce the viscosity of the dispersion of said amine and improve the flow properties of the dispersion.

9. A composition according to claim 8 wherein the amine salt is formed with an organic carboxylic acid having a disassociation constant greater than $10^{-6}$.

10. A composition according to claim 8 wherein the amine salt is formed with a strong non-oxidizing inorganic acid.

11. A composition according to claim 10 wherein the acid is sulfuric acid.

References Cited in the file of this patent

UNITED STATES PATENTS 2,510,035   Mack _____ May 30, 1950